(12) United States Patent
Kozakai

(10) Patent No.: US 8,704,407 B2
(45) Date of Patent: Apr. 22, 2014

(54) WIRELESS POWER SUPPLYING RACK

(75) Inventor: Osamu Kozakai, Kanagawa (JP)

(73) Assignee: Sony Corporation, Tokyo (JP)

( * ) Notice: Subject to any disclaimer, the term of this patent is extended or adjusted under 35 U.S.C. 154(b) by 565 days.

(21) Appl. No.: 12/986,719

(22) Filed: Jan. 7, 2011

(65) Prior Publication Data
US 2011/0175456 A1 Jul. 21, 2011

(30) Foreign Application Priority Data

Jan. 15, 2010 (JP) ................................. 2010-006525

(51) Int. Cl.
*H01F 37/00* (2006.01)
(52) U.S. Cl.
USPC ............ 307/104; 307/149; 307/226; 336/121
(58) Field of Classification Search
USPC .................................... 307/104, 149; 336/121
See application file for complete search history.

(56) References Cited

U.S. PATENT DOCUMENTS

| 2009/0015075 A1* | 1/2009 | Cook et al. ..................... 307/149 |
| 2011/0133569 A1* | 6/2011 | Cheon et al. .................. 307/104 |

FOREIGN PATENT DOCUMENTS

JP 2008-305737 * 12/2008

* cited by examiner

*Primary Examiner* — Rexford Barnie
*Assistant Examiner* — Jagdeep Dhillon
(74) *Attorney, Agent, or Firm* — Sony Corporation

(57) ABSTRACT

Disclosed herein is a wireless power supplying rack, including: a power transmission device adapted to transmit power to be supplied; a repeater device adapted to repeat the transmission power of the power transmission device; a power reception device adapted to receive the power repeated by the repeater device; and a main body in which a load to which the power received at least by the power reception device from between the power reception device and the repeater device is supplied is disposed; at least the repeater device and the power reception device from among the power transmission device, repeater device and power reception device being incorporated in the main body; wherein the power transmission device, the repeater device and the reception device have a first resonance element, a second resonance element and a third resonance element, respectively.

22 Claims, 8 Drawing Sheets

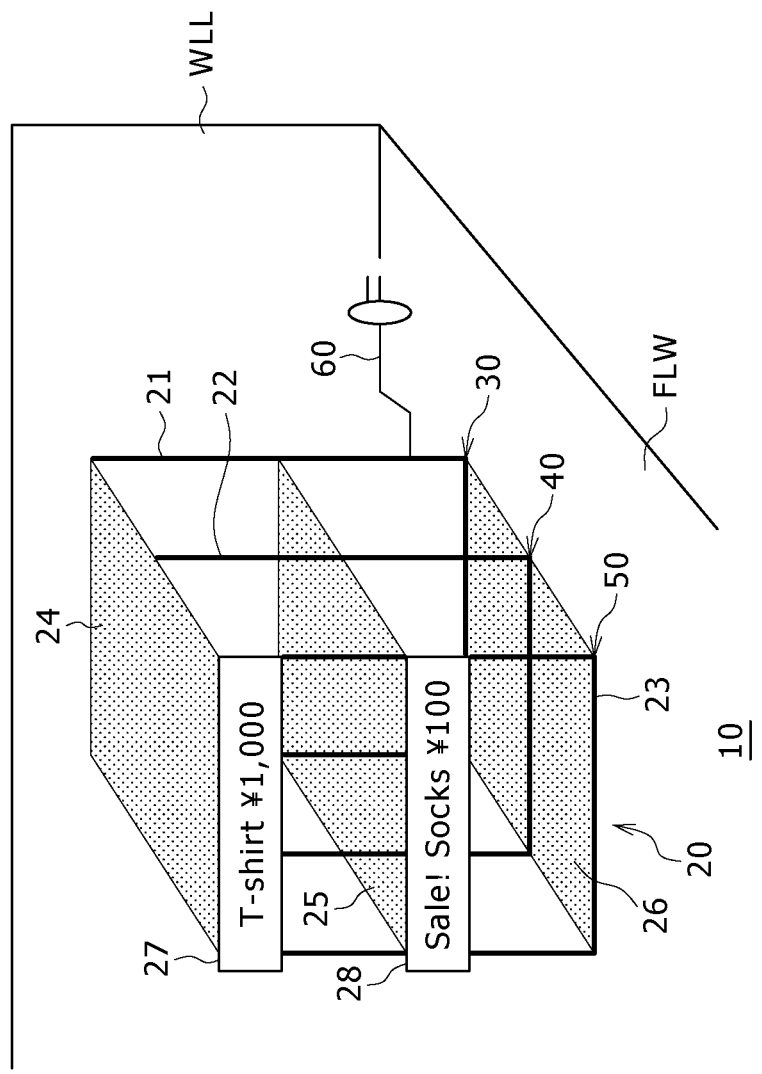

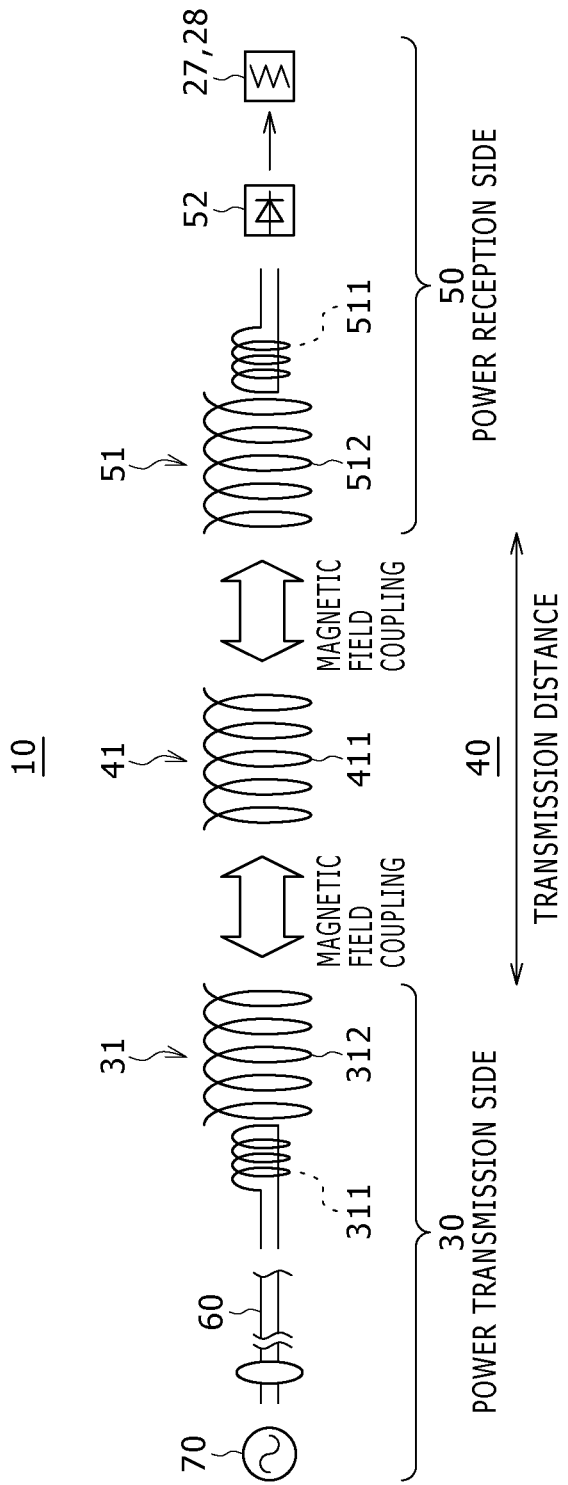

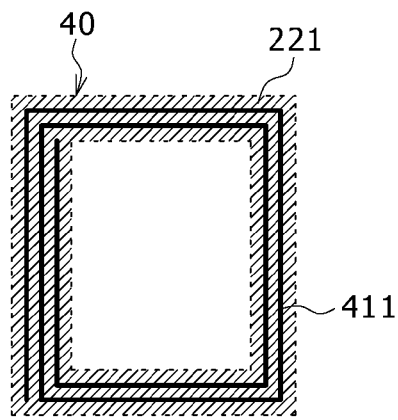
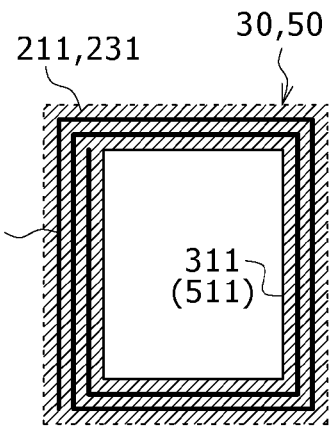
POWER TRANSMISSION AND RECEPTION CIRCUITS NOT SHOWN ARE REQUIRED
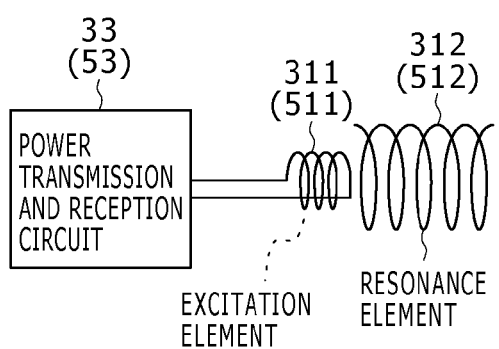
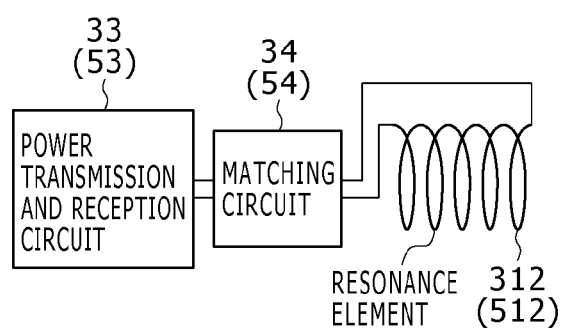

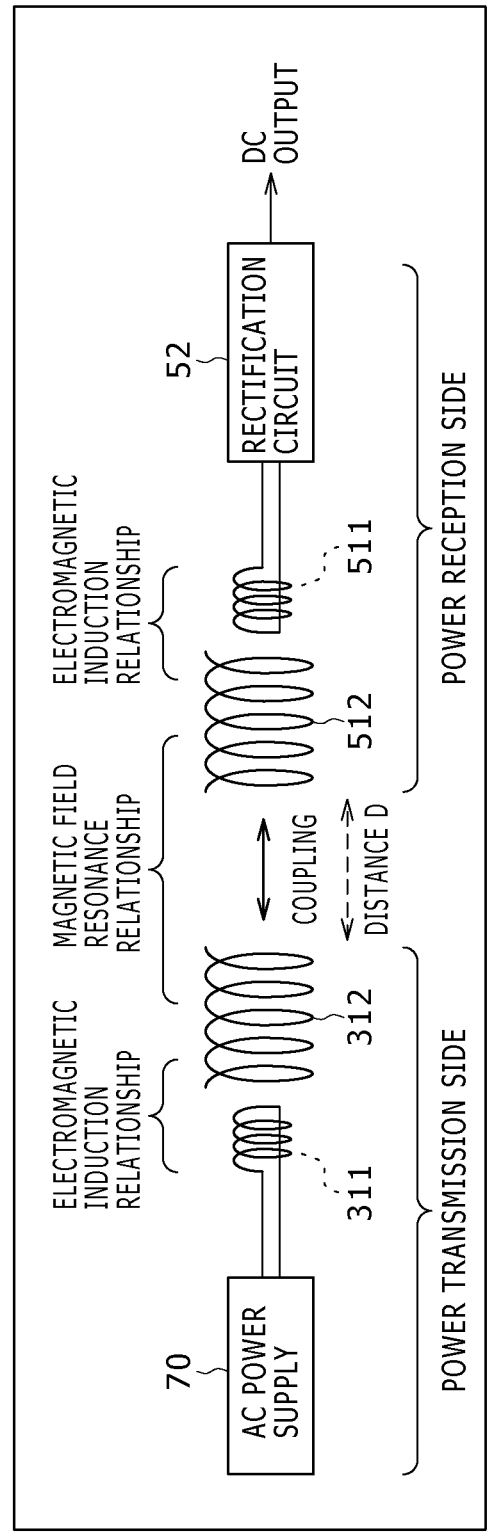

WIRELESS POWER SUPPLYING RACK

BACKGROUND OF THE INVENTION

1. Field of the Invention

This invention relates to a wireless power supplying rack of the contactless power supplying type which can supply power in a contactless or wireless fashion to a load such as a lighting fixture or a display device on a display rack or the like.

2. Description of the Related Art

For example, a technique for supplying power to a display device on a commodity rack is disclosed in Japanese Patent Laid-Open No. 2008-305737 (hereinafter referred to as Patent Document 1).

In the technique disclosed in Patent Document 1, a rail of a DC power supply is embedded in a front face portion of a rack, and an attachment having a contact for establishing continuity with the rail is fitted with the rail to allow power supply to the attachment.

SUMMARY OF THE INVENTION

However, according to the technique of Patent Document 1 described above, basically a cable is used for power supply to any other member than the power supply rail on the front face of the rack.

Therefore, the technique is disadvantageous in that, when the rack is assembled or disassembled, the cable is likely to be damaged and time is required for connection or disconnection of a connection section and besides the rack is inferior in design property and convenience.

In recent years, attention has been and is paid to a wireless power supply system and a wireless charging system in which a method called magnetic field resonance method which utilizes an electromagnetic resonance phenomenon is used without using a cable.

In a contactless power supply system of the electromagnetic induction type which is used most widely at present, it is necessary for a power supply source and a power supply destination, which is the power reception side, to commonly use magnetic fluxes. Therefore, in order to transmit power efficiently, it is necessary to dispose the power supply source and the power supply destination very closely to each other, and also alignment for coupling is significant.

Meanwhile, a contactless power supply system which utilizes an electromagnetic resonance phenomenon is advantageous in that, from the principle of the electromagnetic resonance phenomenon, power can be transmitted over a greater distance than that by the electromagnetic induction system and besides, even if the alignment is somewhat rough, the transmission efficiency does not drop very much.

It is to be noted that, as the electromagnetic resonance phenomenon, not only magnetic field resonance but also electric field resonance are available.

Further, in recent years, a wireless power transmission technique has been reported which achieves transmission of power of 60 W over a distance of 2 m by adopting the magnetic field resonance system which utilizes a resonance phenomenon of a magnetic field.

Also development of a "wireless power supply system" of a high efficiency has been reported which transmits power of 60 W to drive an electronic apparatus at a place spaced by 50 cm by adopting the magnetic field resonance system.

As described hereinabove, the wireless power supply or power transmission system of the magnetic field resonance type is similar to the electromagnetic induction system in that power is transmitted through a magnetic field. However, the magnetic field resonance system can achieve transmission over a much greater transmission distance than the electromagnetic induction system by utilization of the resonance phenomenon.

However, in order to achieve such a high performance, an excellent resonator, or in other words, a resonator having a high Q value, is required.

That the Q value is high signifies that the frequency characteristic is sharp, and this has a tradeoff relationship with the bandwidth. Then, the narrow bandwidth is related to the following drawbacks.

1) If the frequency of the carrier is displaced, then the transmission efficiency drops significantly.
2) If the resonance frequency is displaced by a variation of the surrounding situation or a temperature variation, then the transmission efficiency drops significantly.
3) Power cannot be transmitted with any other frequency than the resonance point.

In order to transmit power with a frequency other than the resonance frequency set in advance, it is necessary to change the resonance frequency. Therefore, it is necessary to vary the setting of some constant.

This gives rise to mechanical complication and makes a factor of deterioration of an electric characteristic such as a drop of the Q value of the resonator.

Therefore, it is desirable to provide a wireless power supply rack which can supply power in a wireless fashion and in a high efficiency without using a cable and is high in design property and convenience without giving rise to complication in mechanism.

According to an embodiment of the present invention, there is provided a wireless power supplying rack including a power transmission device adapted to transmit power to be supplied, a repeater device adapted to repeat the transmission power of the power transmission device, a power reception device adapted to receive the power repeated by the repeater device, and a main body in which a load to which the power received at least by the power reception device from between the power reception device and the repeater device is supplied is disposed, at least the repeater device and the power reception device from among the power transmission device, repeater device and power reception device being incorporated in the main body, the power transmission device including a first resonance element for receiving the power supplied thereto and transmitting the received power, the repeater device including a second resonance element for receiving the power transmitted thereto from the first resonance element through a magnetic field resonance relationship and transmitting the received power, the reception device including a third resonance element for receiving the power transmitted thereto from the repeater device through a magnetic field resonance relationship.

With the wireless power supplying rack, power can be supplied in a wireless fashion without using a cable. Further, the supply of power can be carried out with a high design property, high convenience and a high power supplying efficiency without giving rise to complication in mechanism.

The above and other features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 1 is a schematic view showing an example of a configuration of a wireless power supply system according to a first embodiment of the present invention;

FIG. 2 is a schematic view illustrating equivalent blocks of a wireless power supply rack of the wireless power supply system of FIG. 1;

FIGS. 3A and 3B are schematic views illustrating an example of incorporation of a coil into a frame of a repeater device and a power transmission or reception device, respectively;

FIGS. 4A and 4B are schematic views illustrating an example of incorporation of a circuit into the frame of the repeater device and the power transmission or reception device;

FIG. 5 is a schematic view illustrating a principle of a magnetic field resonance system;

DETAILED DESCRIPTION OF THE PREFERRED EMBODIMENTS

Figure 6:
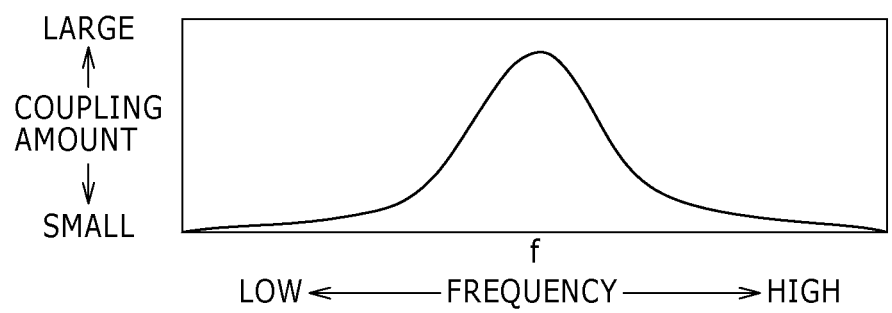
FIG. 6 is a diagram illustrating a frequency characteristic of the coupling amount in the magnetic field resonance system.

In the following, preferred embodiments of the present invention are described with reference to the accompanying drawings.

It is to be noted that the description is given in the following order:
1. First Embodiment (first configuration example of the wireless power supply rack)
2. Second Embodiment (second configuration example of the wireless power supply rack)
3. Third Embodiment (third configuration example of the wireless power supply rack)

1. First Embodiment

FIG. 1 shows an example of a configuration of a wireless power supply rack according to a first embodiment of the present invention, and FIG. 2 shows equivalent blocks of the wireless power supply rack.

Referring to FIGS. 1 and 2, the wireless power supplying rack 10 shown includes a rack main body 20, a power transmission device 30, a repeater device 40 and a power reception device 50.

In the wireless power supplying rack 10 according to the present first embodiment, the power transmission device 30, repeater device 40 and power reception device 50 are incorporated in frames which configure the skeleton of the rack main body 20 itself as hereinafter described in detail.

The rack main body 20 includes a first frame 21, a second frame 22 and a third frame 23 disposed in a predetermined spaced relationship from each other so as to form a skeleton.

The first frame 21, second frame 22 and third frame 23 are non-cut loop-shaped framework members of a rectangular shape. Each framework member is formed, for example, from four hollow struts.

The first frame 21, second frame 22 and third frame 23 are disposed such that they extend, for example, in parallel to a wall face WLL and perpendicularly to a floor face FLW.

The power transmission device 30 is mounted on the first frame 21 which is disposed on one side portion of the rack main body 20 from among the first frame 21, second frame 22 and third frame 23.

The power reception device 50 is mounted on the third frame 23 which is disposed on the other side portion of the rack main body 20 from among the first frame 21, second frame 22 and third frame 23.

The repeater device 40 is mounted on the second frame 22 which is disposed between the one side portion and the other side portion of the rack main body 20 from among the first frame 21, second frame 22 and third frame 23.

The first frame 21, second frame 22 and third frame 23 are formed from a non-conductive material such as ABS (Acrylonitrile butadiene styrene) or PC (Polycarbonate).

The rack main body 20 has a first plate 24, a second plate 25 and a third plate 26 for a display rack disposed in a predetermined spaced relationship in a heightwise direction of the frames 21 to 23 on the first frame 21, second frame 22 and third frame 23.

The first plate 24 has not only a function of a display rack but also a function of a top plate, and the third plate 26 has not only a function of a display rack but also a function as a base which allows the wireless power supplying rack 10 to be placed stably on the floor face FLW.

Further, the rack main body 20 has display devices 27 and 28 as a load which receives driving power from the power reception device 50.

The display devices 27 and 28 are configured, for example, from a liquid crystal display (LCD) device.

The display device 27 is disposed in the proximity of the arrangement position of the first plate 24 on the front face side of the third frame 23 and displays the name, price and so forth of commodities placed on the first plate 24 under the control of a control system not shown.

The display device 28 is disposed in the proximity of the arrangement position of the second plate 25 on the front face side of the third frame 23 and displays the name, price and so forth of commodities placed on the second plate 25 under the control of the control system not shown.

The power transmission device 30 has a function of transmitting AC (alternate current) power supplied thereto from a power supply cable 60.

The power transmission device 30 includes a power transmission coil section 31.

The power transmission coil section 31 has a power supplying coil 311 serving as a power supply element and a resonance coil 312 serving as a first resonance element.

Although a resonance coil is also called consonance coil, in the description of the present embodiment, the term resonance coil is used.

The power supplying coil 311 is formed from a loop coil to which AC current is supplied, for example, through the power supply cable 60.

The resonance coil 312 functions as a resonator and is formed from an air-core coil which couples to the power supplying coil 311 by electromagnetic induction. The resonance coil 312 transmits AC power supplied from the power supplying coil 311 efficiently in a wireless fashion.

It is to be noted that, on the power supply side, the power supplying coil 311 and the resonance coil 312 are coupled to each other strongly by electromagnetic induction.

The resonance coil 312 enters a magnetic field resonance relationship when the self resonance frequency thereof coincides with that of a resonance coil 411 of the repeater device 40 and transmits power efficiently when it is in the magnetic field resonance relationship.

The power transmission device 30 having such a configuration as described above is incorporated in the first frame 21 of the rack main body 20.

The repeater device 40 has a function of repeating power transmitted from the power transmission device 30.

The repeater device 40 includes a transmission and reception coil section 41.

The transmission and reception coil section 41 has a resonance coil 411 as a second resonance element.

The resonance coil 411 and the resonance coil 312 of the power transmission device 30 can be coupled to each other through a magnetic field resonance relationship, and the resonance coil 411 functions as a resonator at an intermediate stage.

Similarly, the resonance coil 411 and a resonance coil of the power reception device 50 can be coupled to each other through a magnetic field resonance relationship, and the resonance coil 411 functions as resonator at an intermediate stage.

The resonance coil 411 is formed from an air-core coil and, when the self resonance frequencies of the resonance coil 411 and a resonance coil 512 of the power reception device 50 coincide with each other, a magnetic field resonance relationship is established in which power is transmitted efficiently.

The repeater device 40 having such a configuration as described above is incorporated in the second frame 22 of the rack main body 20.

The power reception device 50 has a function of receiving power repeated by the repeater device 40.

The power reception device 50 includes a power reception coil section 51 and a rectification circuit 52 and supplies received power to an electronic apparatus of a load which is a supplying destination of the power, for example, to the display devices 27 and 28.

The power reception coil section 51 has a power transmission coil 511 serving as a power supplying element and a resonance coil 512 serving as a third resonance element.

The power transmission coil 511 is supplied with AC current by electromagnetic induction from the resonance coil 512.

The resonance coil 512 is formed from an air-core coil which is coupled to the power transmission coil 511 by electromagnetic induction, and when the self resonance frequencies of the resonance coil 411 of the repeater device 40 and the resonance coil 512 coincide with each other, a magnetic resonance relationship is established in which the resonance coil 512 receives power efficiently.

The resonance coil 512 functions as a power reception side resonator.

It is to be noted that a matching circuit not shown having an impedance matching function is disposed at a connecting portion between the power transmission coil 511 and the load, that is, to a load end of the power transmission coil 511.

The rectification circuit 52 rectifies received AC power into DC power. A voltage stabilization circuit not shown converts the DC power supplied from the rectification circuit 52 into a DC voltage conforming to specifications of the electronic apparatus of the supplying destination of the DC power, and the stabilized DC voltage is supplied to a processing system of the electronic apparatus of the load.

The power reception device 50 having such a configuration as described above is incorporated in the third frame 23 of the rack main body 20.

FIGS. 3A and 3B illustrate an example of incorporation of a repeater device and power transmission and reception devices into a frame, respectively.

FIGS. 4A and 4B illustrate examples of incorporation of a repeater device and power transmission and reception devices into a frame including a circuit.

Referring to FIGS. 3A to 4B, a repeater device is configured from a resonance (consonance) element (coil) 411 of a resonance frequency fo disposed in the inside of struts 221 formed from a nonconductive substance such as ABS or PC.

Since the resonance coil 411 preferably has a high Q value, it is usually formed from a metal having high conductivity such as copper, silver or aluminum.

The struts which accommodate a coil therein are preferably formed using a nonconductive material such as ABS or PC in order to reduce an electric bad influence on the coil while strength as the struts 221 is maintained.

It is necessary for the power transmission device 30 and the power reception device 50 to accommodate, in addition to the resonance coils 312 and 512, power supply coils 311 and 511 which are excitation elements and power transmission and reception circuits 33 and 53 including rectification circuits and so forth in the inside of the struts 211 and 231, respectively, as shown in FIG. 4A.

It is to be noted, however, that, where no sufficient space is available, the power supplying coils as the excitation elements may be omitted while matching circuits 34 and 54 each formed from an LC circuit is inserted instead. However, a matching circuit formed from an LC circuit tends to exhibit comparatively high loss.

It is to be noted that, also where a power supplying coil is provided, the matching circuits 34 and 54 may otherwise be incorporated for impedance adjustment at a power supplying point or a connecting point to a load.

Now, operation of the wireless power supplying rack 10 having the configuration described above is described particularly in regard to a principle of a magnetic field resonance system and general operation of the wireless power supplying rack according to the present embodiment.

[Principle of the Magnetic Field Resonance System]

First, the principle of the magnetic field resonance system is described with reference to FIGS. 5 to 8.

FIG. 5 illustrates the principle of the magnetic field resonance system.

It is to be noted here that the description is given of the principle where the power supplying coil is a power supplying element and the resonance (consonance) coil is a resonance (consonance) element.

Although electric field resonance and magnetic field resonance are available as the electromagnetic resonance phenomenon, FIG. 5 shows basic blocks where the wireless or contactless power supplying rack uses the magnetic field resonance system and includes a power transmission side and a power reception side provided in a one-by-one corresponding relationship.

In a corresponding relationship with the configuration shown in FIGS. 1 and 2, the power supply side includes an AC power supply 70, a power supplying element 311 and a resonance element 312, and the power reception side includes a resonance element 512, a power transmission element 511 and a rectification circuit 52.

The power supply elements 311 and 511 and the resonance elements 312 and 512 are each formed from an air-core coil.

On the power transmission device 30 side, the power supplying element 311 and the resonance element 312 are coupled to each other strongly by electromagnetic induction. Similarly, on the power reception device 50 side, the power transmission element 511 and the resonance element 512 are coupled to each other strongly by electromagnetic induction.

When the self resonance (consonance) frequencies of the air-core coils of the resonance elements 312 and 512 on the power transmission side and the power reception side coincide with each other, the resonance elements 312 and 512 have a magnetic field resonance relationship, in which the coupling amount is in the maximum while the loss is in the minimum.

From the AC power supply 70, AC current is supplied to the power supplying element 311. Further, current is induced in the resonance element 312 by electromagnetic induction.

The frequency of AC current to be generated by the AC power supply 70 is set equal to the self resonance frequencies of the resonance elements 312 and 512.

The resonance element 312 and the resonance element 512 are disposed in a mutually magnetic field resonance relationship, and in the resonance frequency, AC power is supplied in a wireless or contactless fashion from the resonance element 312 to the resonance element 512.

On the power reception side, current is supplied from the resonance element 512 to the power transmission element 511 by electromagnetic induction, and DC current is generated by and outputted from the rectification circuit 52.

FIG. 6 illustrates a frequency characteristic of the coupling amount in the magnetic field resonance system.

Referring to FIG. 6, the axis of abscissa indicates the frequency f of the AC power supply and the axis of ordinate indicates the coupling amount.

Particularly, FIG. 6 illustrates a relationship between the frequency of the AC power supply and the coupling amount.

It can be recognized from FIG. 6 that frequency selectivity is exhibited by the magnetic resonance.

Figure 7:
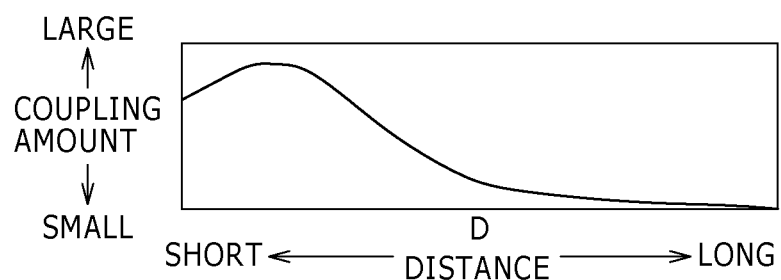
FIG. 7 is a diagram illustrating a relationship between the distance between resonance elements and the coupling amount in the magnetic field resonance system.

FIG. 7 illustrates a relationship between the distance between resonance elements and the coupling amount in the magnetic field resonance system.

Referring to FIG. 7, the axis of abscissa indicates the distance D between the resonance elements and the axis of ordinate indicates the coupling amount.

Particularly, FIG. 7 illustrates a relationship between the distance D between the resonance element 312 on the power transmission side and the resonance element 512 on the power reception side and the coupling relationship.

It can be recognized from FIG. 7 that, at a certain resonance frequency, a distance D exists with which the coupling amount is in the maximum.

Figure 8:
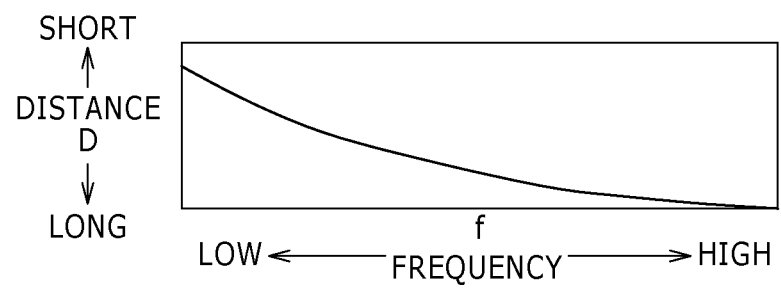
FIG. 8 is a diagram illustrating a relationship between a resonance frequency and the distance between resonance elements with which a maximum coupling amount is obtained in the magnetic field resonance system.

FIG. 8 illustrates a relationship between the resonance frequency and the distance between the resonance elements with which a maximum coupling amount is obtained in the magnetic field resonance system.

Referring to FIG. 8, the axis of abscissa indicates the frequency f and the axis of ordinate indicates the distance D between the resonance elements.

Particularly, FIG. 8 illustrates a relationship between the resonance frequency and the distance D between the resonance element 312 on the power transmission side and the resonance element 512 on the power reception side.

It can be recognized from FIG. 8 that a maximum coupling amount can be obtained by setting a large distance between the resonance elements where the resonance frequency is low but by setting a small distance between the resonance elements where the resonance frequency is high.

General operation of the wireless power supplying rack of the present embodiment in which a repeater device is disposed in the magnetic field resonance system based on the principle described above is described particularly in regard to the repeater device.

In the present first embodiment, the resonance element 411 having the same resonance frequency as that of the resonance elements 312 and 512 on the power transmission side and the power reception side is disposed on the same linear line between the resonance elements 312 and 512 as seen in FIG. 2.

In the configuration just described, since the resonance element 312 and the resonance element 411 are coupled to each other by a magnetic field and the resonance element 411 and the resonance element 512 are coupled to each other by a magnetic field to supply power, the resonance element 411 functions as the repeater device 40 or repeater deice.

Further, where the resonance element 411 is disposed in an aligned relationship at the middle point between the resonance elements 312 and 512, a maximum efficiency is obtained.

In the present first embodiment, the power transmission device 30 which is the power transmission side resonance element+excitation element in FIG. 2 is placed in the framework of the first frame 21 positioned in the interior side in FIG. 2.

Most forwardly, the power reception device 50 which is the power reception side resonance element+excitation element in FIG. 2 is placed.

Where the distance between the power transmission side and the power reception side is large and the transmission performance is insufficient, the intermediate second frame 22 may be used to configure the repeater device 40 or repeater.

Here, as the power supply cable 60, only a power supply cable for connecting the power transmission device and an AC plug is required, and any other cable is required.

By disposing the resonance element 411 of the repeater device 40 at an intermediate point between the resonance element 312 of the power transmission device 30 and the resonance element 512 of the power reception device 50 in this manner, the power supply distance can be increased.

As a result, a power supply distance exceeding the power transmission capacity of an ordinary magnetic field resonance system can be obtained.

2. Second Embodiment

Figure 9:
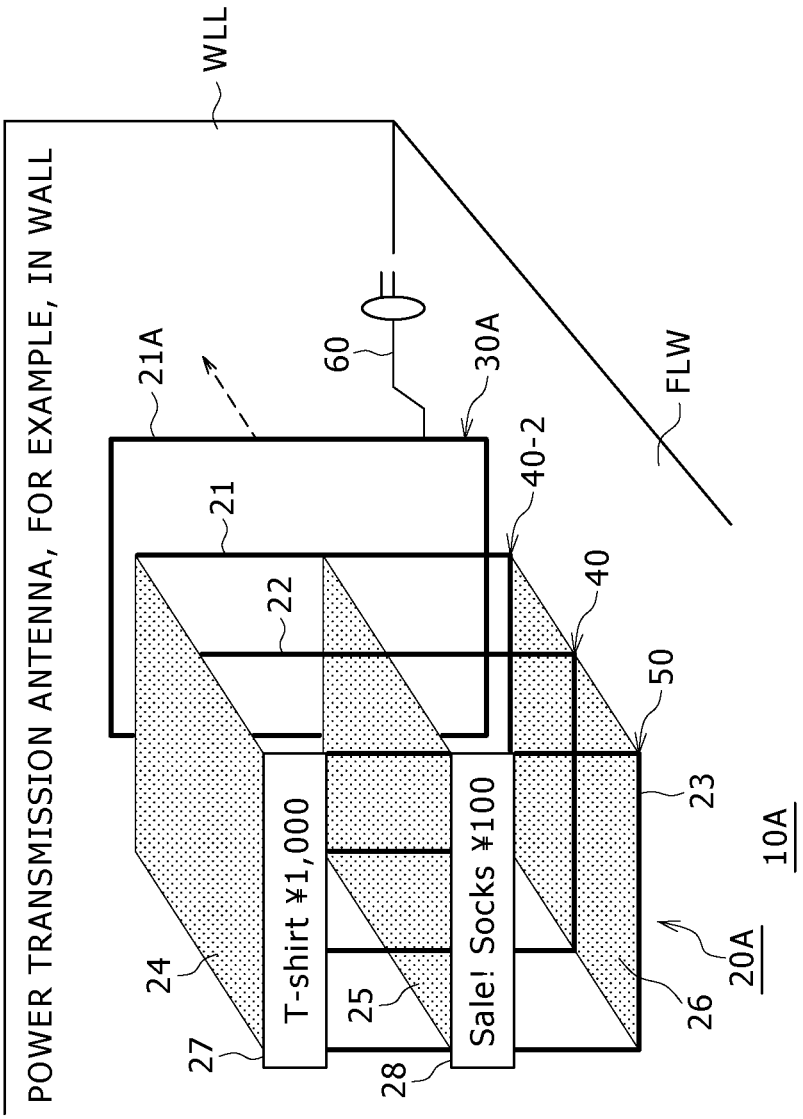
FIG. 9 is a schematic view showing an example of a configuration of a wireless power supply system according to a second embodiment of the present invention.
Figure 10:
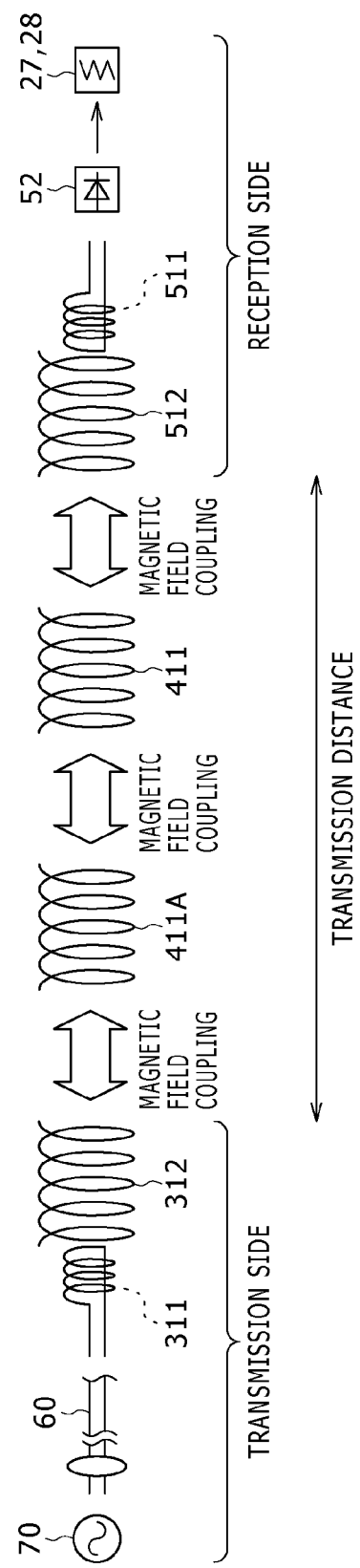
FIG. 10 is a schematic view showing equivalent blocks of a wireless power supply rack of the wireless power supply system of FIG. 9.

FIG. 9 shows an example of a configuration of a wireless power supplying rack according to a second embodiment of the present invention, and FIG. 10 shows equivalent blocks of the wireless power supply rack of FIG. 9.

Referring to FIGS. 9 and 10, the wireless power supplying rack 10A according to the present second embodiment is similar to but different from the wireless power supplying rack 10 according to the first embodiment in that a repeating device 40-2 is incorporated in the first frame 21 in place of the power transmission device 30.

Further, in the present second embodiment, the first frame 21 on which the power transmission device 30A is mounted is formed as a non-skeleton frame 21A disposed outside the main body 20A.

The non-skeleton frame 21A is embedded, for example, in the wall face WLL.

In this instance, in order to obtain a high power supply efficiency, the main body 20A is disposed such that the resonance coil 312 of the power transmission device 30A is opposed to the resonance coil 411A of the repeater device 40-2 in the first frame 21 on one side portion of the main body 20A.

By the disposition of the main body 20A, the display rack comes to require no power supply cable and is designed so clear-cut that it can be assembled and disassembled readily.

3. Third Embodiment

Figure 11:
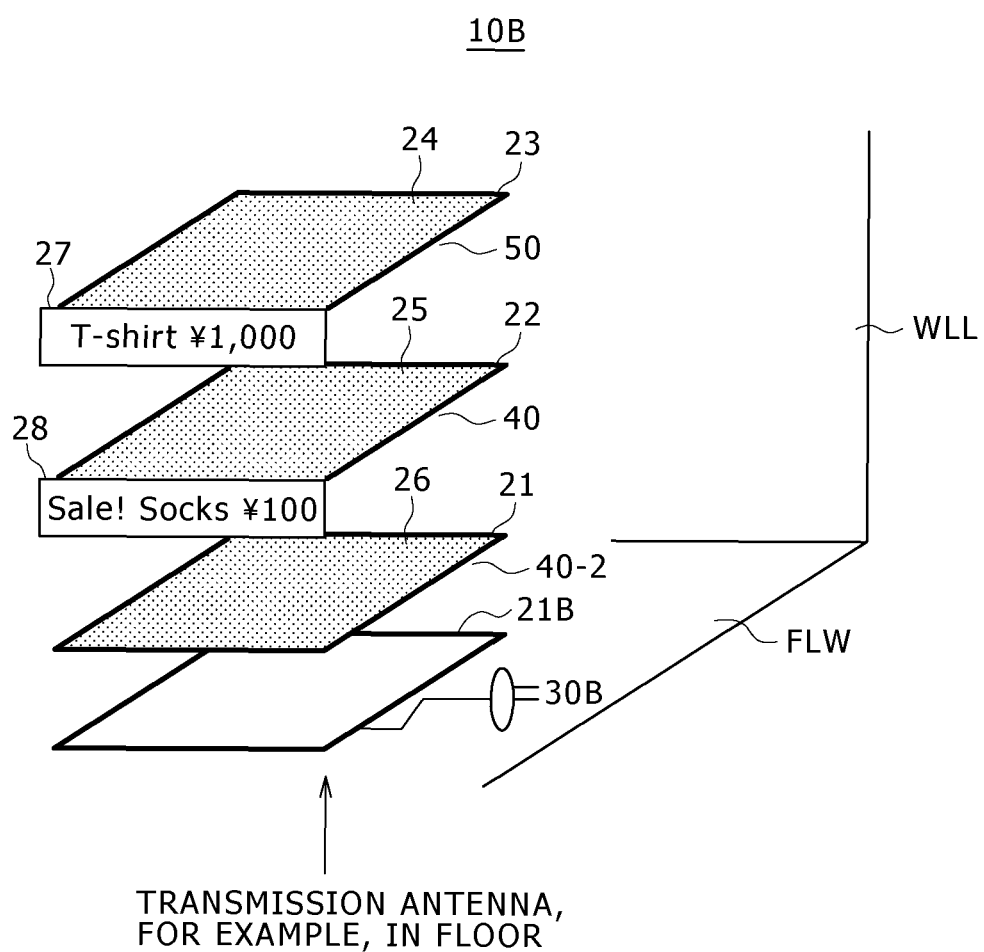
FIG. 11 is a schematic view showing an example of a configuration of a wireless power supply system according to a third embodiment of the present invention.

FIG. 11 shows an example of a configuration of a wireless power supplying rack according to a third embodiment of the present invention.

Referring to FIG. 11, the wireless power supplying rack 10B according to the present third embodiment is similar to but different from the wireless power supplying rack 10A according to the second embodiment in that the non-skeleton frame 21B is embedded not in the wall face WLL but in the floor face FLW.

Further, the first frame 21, second frame 22 and third frame 23 are disposed in a predetermined spaced relationship in order from the floor face FLW toward the top plate side such that they are opposed to the loop portion of the non-skeleton frame 21B.

Also in this instance, the display rack comes to require no power supply cable and is designed so clear-cut that it can be assembled and disassembled readily.

As described above, according to the present embodiment, the following advantages can be achieved.

In particular, according to the present embodiment, when an electronic apparatus such as an electronic display tag or the like is attached to a display rack, the number of required cables can be minimized, and the display rack which can be assembled and disassembled readily can be implemented. Further, the display rack can be moved readily and can significantly reduce cumbersomeness upon cleaning.

The present application contains subject matter related to that disclosed in Japanese Priority Patent Application JP 2010-006525 filed in the Japan Patent Office on Jan. 15, 2010, the entire content of which is hereby incorporated by reference.

It should be understood by those skilled in the art that various modifications, combinations, sub-combinations and alterations may occur depending on design requirements and other factor in so far as they are within the scope of the appended claims or the equivalents thereof.

What is claimed is:

1. A wireless power supplying rack, comprising:
   a power transmission device operable to transmit power to be supplied;
   a repeater device operable to receive and repeat said power transmitted by said power transmission device;
   a power reception device operable to receive said power repeated by said repeater device; and
   a main body in which a load is disposed, wherein said load receives to said power received by said power reception device,
   wherein said power transmission device, said repeater device and said power reception device are incorporated in said main body,
   wherein said power transmission device comprises
   a first resonance element for receiving said transmitted power thereto and transmitting said power received by said first resonance element,
   wherein said repeater device comprises
   a second resonance element for receiving said power transmitted from said first resonance element and transmitting said power received by said second resonance element, and
   wherein said power reception device comprises
   a third resonance element for receiving said power transmitted from said second resonance element.

2. The wireless power supplying rack according to claim 1, wherein said main body comprises
   a plurality of frames disposed in a predetermined spaced relationship from each other to form a skeleton such that said power reception device is incorporated in one of said plurality of frames while said repeater device is incorporated in another one of said plurality of frames.

3. The wireless power supplying rack according to claim 2, wherein each of said first, second and third resonance elements is formed from a coil, and each of said plurality of frames is formed from a framework of a non-conductive material of a loop shape in such a manner as to form a space at a central portion thereof and said coil which forms each of said first, second and third resonance elements forms a loop in said framework.

4. The wireless power supplying rack according to claim 3, wherein said power transmission device comprises a first power supplying element to which power from a power supply is supplied and which is coupled to said first resonance element by electromagnetic induction and said power reception device comprises a second power supplying element which is coupled to said third resonance element by electromagnetic induction such that said power received by said third resonance element is supplied to said power reception device, and each of said first and second power supplying elements is formed from said coil and is incorporated in said plurality of frames together with said coil which forms said first, second and third resonance elements.

5. The wireless power supplying rack according to claim 1, wherein said main body comprises
   a plurality of frames disposed in a predetermined spaced relationship from each other to form a skeleton such that said power reception device is incorporated in one of said plurality of frames which is disposed on one side portion of said main body while said power transmission device is incorporated in another one of said plurality of frames which is disposed on another side portion of said main body opposing said one side portion and said repeater device is incorporated in said one of said plurality of frames which is disposed between said one side portion and said another side portion of said main body.

6. The wireless power supplying rack according to claim 5, wherein each of said first, second and third resonance elements is formed from a coil, and each of said plurality of frames is formed from a framework of a non-conductive material of a loop shape in such a manner as to form a space at a central portion thereof and said coil which forms each of said first, second and third resonance elements forms a loop in said framework.

7. The wireless power supplying rack according to claim 6, wherein said power transmission device comprises a first power supplying element to which power from a power supply is supplied and which is coupled to said first resonance element by electromagnetic induction and said power reception device comprises a second power supplying element which is coupled to said third resonance element by electromagnetic induction such that said power received by said third resonance element is supplied to said power reception device, and each of said first and second power supplying elements is formed from said coil and is incorporated in said plurality of frames together with said coil which forms said first, second and third resonance elements.

8. The wireless power supplying rack according to claim 1, wherein said main body comprises
a plurality of frames disposed in a predetermined spaced relationship from each other to form a skeleton such that said power reception device is incorporated in one of said plurality of frames which is disposed on one side portion of said main body and said repeater device is incorporated in plural ones of said plurality of frames disposed in a predetermined spaced relationship from said one side portion of said main body to another side portion of said main body which is opposed to said one side portion while said power transmission device is incorporated in a non-skeleton frame disposed outside said main body such that said power transmission device is opposed to said another side portion.

9. The wireless power supplying rack according to claim 8, wherein each of said first, second and third resonance elements is formed from a coil, and each of said plurality of frames is formed from a framework of a non-conductive material of a loop shape in such a manner as to form a space at a central portion thereof and said coil which forms each of said first, second and third resonance elements forms a loop in said framework.

10. The wireless power supplying rack according to claim 9, wherein said power transmission device comprises a first power supplying element to which power from a power supply is supplied and which is coupled to said first resonance element by electromagnetic induction and said power reception device comprises a second power supplying element which is coupled to said third resonance element by electromagnetic induction such that said power received by said third resonance element is supplied to said power reception device, and each of said first and second power supplying elements is formed from said coil and is incorporated in said plurality of frames together with said coil which forms said first, second and third resonance elements.

11. The wireless power supplying rack according to claim 9, wherein said non-skeleton frame is disposed on one of: a wall, a floor and a ceiling of a room, and said main body is disposed such that a frame from said plurality of frames in which said repeater device is incorporated is disposed in an opposing said non-skeleton frame.

12. The wireless power supplying rack according to claim 1, wherein said power transmission device comprises
a power supplying element to which power from a power supply is supplied and which is coupled to said first resonance element by electromagnetic induction.

13. The wireless power supplying rack according to claim 1, wherein said power reception device comprises a power supplying element which is coupled to said third resonance element by electromagnetic induction such that said power received by said third resonance element is supplied to said power reception device.

14. The wireless power supplying rack according to claim 1, wherein said power transmission device comprises a matching section having an impedance matching function at a power supplying point of said first resonance element.

15. The wireless power supplying rack according to claim 1, wherein said power reception device comprises a matching section having an impedance matching function at a connecting portion between said third resonance element and said load.

16. The wireless power supplying rack according to claim 1, wherein a self resonance frequency of said first resonance element, a self resonance frequency of said second resonance element, and a self resonance frequency of said third resonance element are same.

17. The wireless power supplying rack according to claim 1, wherein said power transmission device receives power from a power supply and wherein frequency of said power received from said power supply is equal to a self resonance frequency of said first resonance element.

18. The wireless power supplying rack according to claim 1, wherein said second resonance element is aligned at a middle position between said second resonance element and said third resonance element.

19. The wireless power supplying rack according to claim 1, wherein said main body comprises
a plurality of frames disposed in a predetermined spaced relationship from each other to form a skeleton such that said power reception device is incorporated in one of said plurality of frames while said repeater device is incorporated in another one of said plurality of frames, wherein each of said plurality of frames is non-cut loop-shaped framework member of a rectangular shape formed from four hollow struts.

20. The wireless power supplying rack according to claim 19, wherein said plurality of frames is formed of Acrylonitrile butadiene styrene (ABS) or Polycarbonate (PC).

21. The wireless power supplying rack according to claim 19, wherein said main body comprises a plurality of plates disposed on said plurality of frames and in a predetermined spaced relationship in a heightwise direction of said plurality of frames.

22. The wireless power supplying rack according to claim 21, wherein said load displays information related to an item placed on said plurality of plates and
wherein said information comprises name and price related to said item.

* * * * *